United States Patent
Dirisala

(10) Patent No.: US 10,162,874 B2
(45) Date of Patent: Dec. 25, 2018

(54) RELATED TABLE NOTIFICATIONS

(71) Applicant: ServiceNow, Inc., Santa Clara, CA (US)

(72) Inventor: Siva Dirisala, Foster City, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 14/993,697

(22) Filed: Jan. 12, 2016

(65) Prior Publication Data

US 2016/0210346 A1 Jul. 21, 2016

Related U.S. Application Data

(60) Provisional application No. 62/104,051, filed on Jan. 15, 2015.

(51) Int. Cl.
| | |
|---|---|
| *G06F 17/30* | (2006.01) |
| *G06F 3/0482* | (2013.01) |
| *G06F 3/0484* | (2013.01) |
| *G06Q 10/00* | (2012.01) |

(52) U.S. Cl.
CPC ...... *G06F 17/30581* (2013.01); *G06F 3/0482* (2013.01); *G06F 3/04842* (2013.01); *G06F 17/3056* (2013.01); *G06F 17/30368* (2013.01); *G06Q 10/00* (2013.01)

(58) Field of Classification Search
CPC .................................................. G06F 17/30
See application file for complete search history.

(56) References Cited

U.S. PATENT DOCUMENTS

| | | | |
|---|---|---|---|
| 9,063,632 B2* | 6/2015 | Beechuk | H04W 4/003 |
| 2007/0162511 A1 | 7/2007 | Venkatesan et al. | |
| 2011/0137940 A1* | 6/2011 | Gradin | G06F 17/30867 707/769 |
| 2013/0091229 A1 | 4/2013 | Dunn et al. | |
| 2013/0166569 A1 | 6/2013 | Navas | |
| 2013/0311518 A1 | 11/2013 | Agbaria | |
| 2014/0317142 A1 | 10/2014 | Naidu | |
| 2015/0193706 A1* | 7/2015 | Iwasaki | G06Q 10/06 705/7.27 |
| 2016/0088420 A1* | 3/2016 | Kim | H04L 67/025 370/328 |
| 2017/0134502 A1* | 5/2017 | Griffin | H04L 67/14 |

OTHER PUBLICATIONS

ServiceNow Product Documentation, Live Feed, http://wiki.servicenow.com/index.php?title=Live_Feed, downloaded Jan. 9, 2015, 13 pp.
ServiceNow Product Documentation, Setting Up Live Feed Table Notifications, http://wiki.servicenow.com/index.php?title=Setting_Up_Live_Feed_Table_Notifications, downloaded Jan. 9, 2015, 4 pp.

(Continued)

*Primary Examiner* — Khanh B Pham
(74) *Attorney, Agent, or Firm* — Fletcher Yoder PC

(57) ABSTRACT

Systems, apparatuses, and methods for related table notifications are disclosed. Notifications are configured for at least two live feeds. Each of the live feeds is associated with a table of a plurality of tables. When data is changed within the table, the notifications are published to the live feeds as long as conditions established for the notifications are met.

20 Claims, 13 Drawing Sheets

(56) References Cited

OTHER PUBLICATIONS

Anonymous; "RedmineIssues—Redmine", Dec. 31, 2014, XP055261075, retrieved from the Internet: URL: https://web.archive.org/web/20141231041618/http://www.redmine.org/projects/redmine/wiki/RedmineIssues, Retrieved on Mar. 24, 2016, 3 pp.
International Search Report and Written Opinion for PCT Application No. PCT/US2017/0013223 dated Mar. 28, 2017; 11 pgs.

* cited by examiner

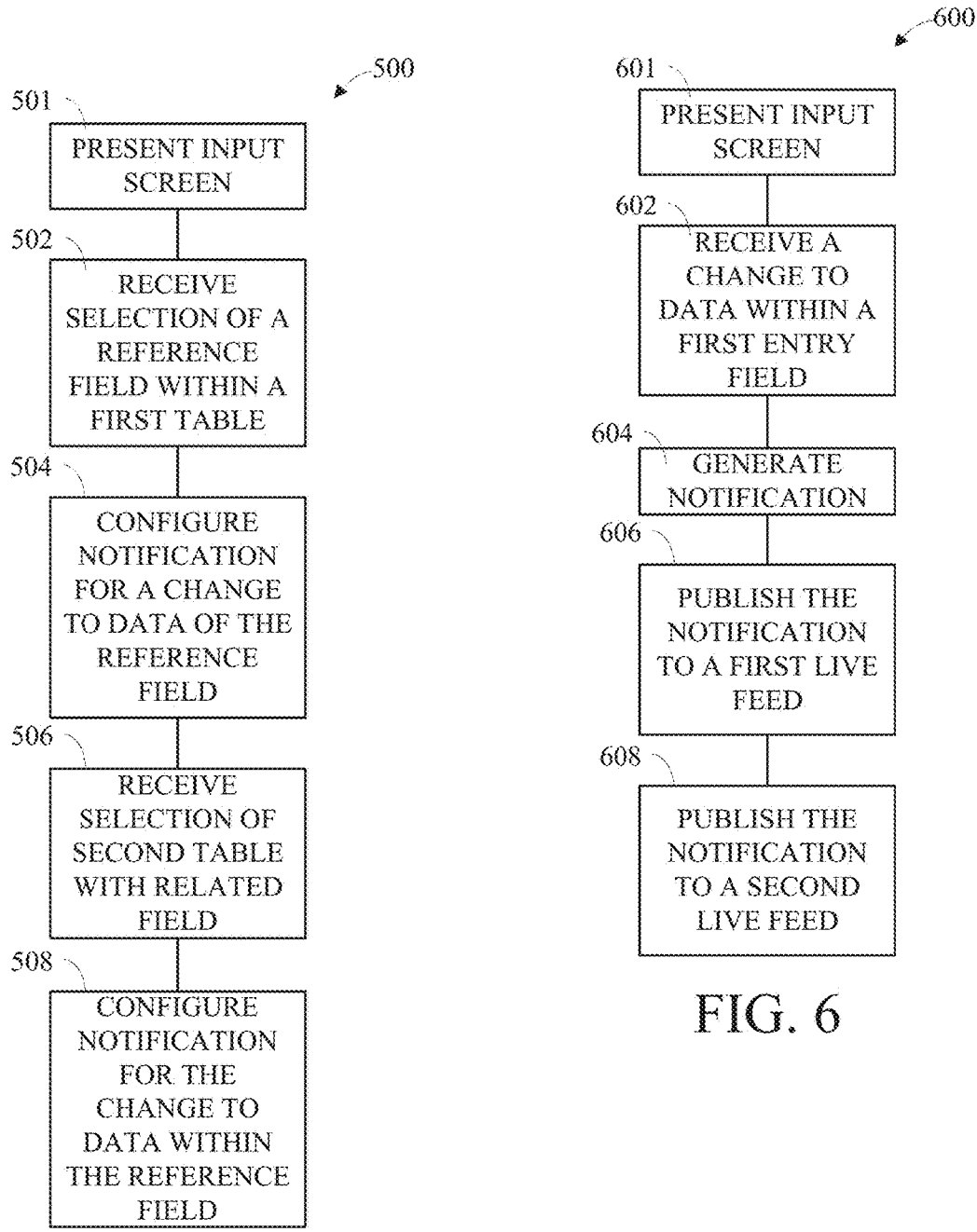

800

| | |
|---|---|
| | ← ≡ Project - Demo project (small) ✎ |

| | |
|---|---|
| ✱ Project Name | Demo project (small) |
| Project manager | [  🔍] |
| Portfolio | [  🔍] |
| Configuration item | [  🔍] |
| Description | [         ] |

Dates

| | |
|---|---|
| Schedule | Project Management Schedule |
| Planned start date | 2013-12-25 12:00:00 📅 |
| Planned end date | 2014-01-10 12:00:00 |
| Planned duration | 12 Days |
| Planned effort | (empty) |

Financials

| | | | |
|---|---|---|---|
| Estimated cost | $ | ▼ | 0.00 |
| Actual cost | $ | ▼ | 0.00 |
| Budget cost | $ | ▼ | 0.00 |

Project Task - Subtask 9.2

Parents: Demo project (small) > Phase 3 > Task 9 > Subtask 9.2

- 902: Phase 3
- 904: Task 9
- 906: Subtask 9.2

| Field | Value |
|---|---|
| * Short description | Subtask 9.2 |
| Number | PRJTASK0000019 |
| Time constraint | Start ASAP |
| Planned start date | 2014-03-13 08:00:00 |
| Planned end date | 2014-01-08 12:00:00 |
| Planned duration | Days 1  Hours 00  00  00 |
| Percent complete | 0 |
| Description | |
| Additional comments (Customer visible) | |
| Work notes | |

Activity: 2015-04-02 22:22:15 jerrod.maint Changed: Assigned t

Assigned to: Person 1

Impact: 3 - Low

Opened by: (Empty)

Priority: 4 - Low

State: Work in Progress

Project - Demo project (small)

| | |
|---|---|
| * Project Name | Demo project (small) |
| Project manager | |
| Portfolio | |
| Configuration Item | |
| Description | |

Dates

| | |
|---|---|
| Schedule | Project Management Schedule |
| Planned start date | 2013-12-25 12:00:00 |
| Planned end date | 2015-01-19 12:00:00 |
| Planned duration | 278 Days |
| Planned effort | (empty) |

Financials

| | | |
|---|---|---|
| Estimated cost | $ | 0.00 |
| Actual cost | $ | 0.00 |
| Budget cost | $ | 0.00 |

RELATED TABLE NOTIFICATIONS

CROSS REFERENCE TO RELATED APPLICATIONS

The present application claims the benefit of U.S. Provisional Application No. 62/104,051, filed Jan. 15, 2015, entitled, "Related Table Notifications," herein incorporated by reference.

TECHNICAL FIELD

The present disclosure relates in general to providing notifications of changes to data through a live feed and particularly with respect to data in related tables.

BACKGROUND

Networked computing systems allow multiple users and/or multiple companies to share computing resources and data. For example, cloud computing relates to the sharing of computing resources that are typically accessed via the Internet. A large number of servers may be configured to execute various programs, such as application servers, web servers, and/or database servers. Data may be stored for shared access systems, in which a group of users have access to common data for moving, sharing, deleting or editing the data.

BRIEF DESCRIPTION OF THE DRAWINGS

The description herein makes reference to the accompanying drawings wherein like reference numerals refer to like parts throughout the several views.

FIG. 5 is a flow chart of a method for setting up a notification for multiple live feeds.

FIG. 6 is a flow chart of a method for publishing a notification to multiple live feeds.

FIGS. 8A & 8B combine to form a screen shot illustrating a live feed of a project before a notification is published.

FIGS. 9A & 9B combine to form a screen shot illustrating an input screen used to make a change in data to a task of the project of FIGS. 8A & 8B.

FIGS. 10A & 10B combine to form a screen shot illustrating the live feed of the project of FIGS. 8A & 8B illustrating published notifications.

BRIEF SUMMARY

Figure 1:
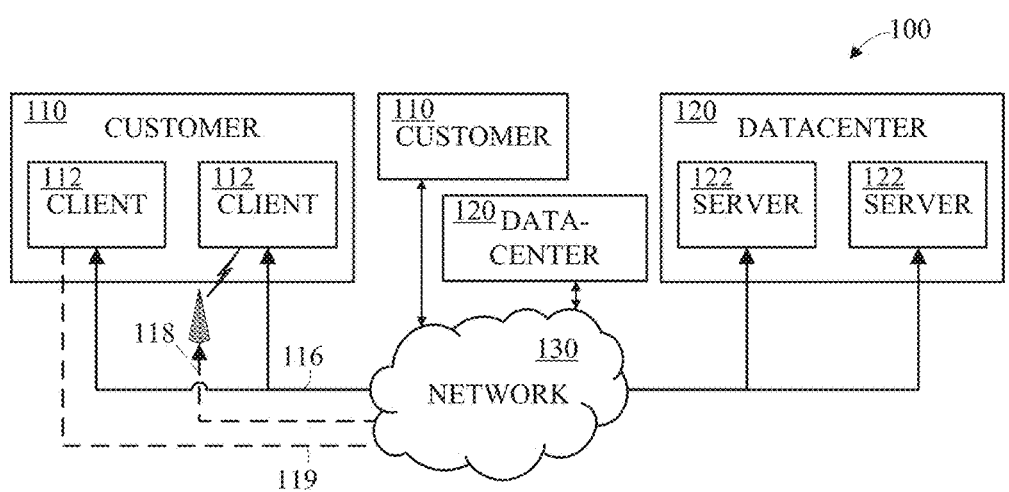
FIG. 1 is a block diagram of a networked distributed or cloud computing system in which the teachings herein may be implemented.

This disclosure describes providing notification of data changes to multiple live feeds identified or selected based on the data being changed.

In one implementation of the teachings herein, an apparatus provides notification of changes to data through a live feed for data in related tables, comprising a processor configured to execute instructions stored in a memory, the instructions comprising a user interface module that presents an input screen for a display device, utilizing a user interface connection, for manipulation by a user, the input screen comprising a first entry field for entry of a change to data stored within a first reference field of a plurality of reference fields within a first table, the first table being one of a plurality of tables and at least some of the plurality of reference fields referring to a related field within another table of the plurality of tables, and receives change data over the user interface connection from the first entry field responsive to the entry of the changed data, a publication module that generates a notification of the change data, publishes the notification over a communications interface to a first live feed associated with the first table, and substantially simultaneously publishes the notification over the communications interface to a second live feed associated with a second table, the second table having a second reference field related to the first reference field.

In another implementation, an apparatus is provided for assigning notification actions for a live feed related to changes in data in related tables, comprising a processor configured to execute instructions stored in a memory, the instructions comprising a notification configuration user interface module that presents an input screen for a configuration display device, utilizing a user interface connection, for manipulation by a user, the input screen comprising a first entry field for entry of a description of a change to be made to data stored within a first table of a plurality of tables, and a second entry field for selection of a reference field of a plurality of reference fields of the first table, at least some of the plurality of reference fields referring to a related field within a related table of the plurality of tables, receives, over the user interface connection a first selection of a first reference field associated with the first table from the second entry field, the description of the change from the first entry field, and a second selection of a second table associated with a second reference field, the second reference field being related to the first reference field, configures the description as a notification associated with the first table, configures the description as a notification associated with the second table, and stores the description in the memory.

In another implementation, a method is provided for assigning notification actions for a live feed related to changes in data in related tables, comprising presenting an input screen on a display device for manipulation by a user, the input screen comprising a first entry field for entry of a description of a change to be made to data stored within a first table of a plurality of tables that are stored in a memory of a computer device, and having a second entry field for selection of at least one of a plurality of reference fields of the first table, at least some of the plurality of reference fields referring to a related field within a related table of the plurality of tables, receiving, at an input of a processor a first selection of a first reference field associated with the first table from the second entry field, the description of the change from the first entry field, and a second selection of a second table associated with a second reference field, the second reference field related to the first reference field, configuring, using the processor, the description as a notification associated with the first table, configuring, using the processor, the description as a notification associated with the second table, and storing the description in the memory.

Details of and variations in these implementations, and other implementations, are described hereinafter.

DETAILED DESCRIPTION

Traditional networked computing models often allocate computing resources to a single customer or entity. Distributed computing models, such as cloud computing, can provide advantages over traditional computing models, including the ability to allocate shared resources amongst many different customers. In either case, the computing resources may be used to implement enterprise computing for individual organizations or for other computing processes that involve multiple users transacting with data. The description herein uses cloud computing as an example of the computing systems in which the teachings herein may be implemented, but this is not a requirement. Other networks computing systems may be used, including local area networks, wide area networks, etc.

Computing resources of a cloud computing infrastructure may be allocated using a multi-tenant or a single-tenant architecture. Under a multi-tenant architecture, installations or instantiations of application, database, and/or other software application servers may be shared amongst multiple customers. For example, a single web server (e.g., a unitary Apache installation), application server (e.g., unitary Java Virtual Machine) and/or a single database server catalog (e.g., a unitary MySQL catalog) may handle requests from multiple customers. In a multi-tenant architecture, data or applications used by various customers can be commingled or shared. In an implementation of this architecture, the application and/or database server software can distinguish between and segregate data and other information of the various customers using the system. For example, database records belonging to a particular customer may be identified using a customer_id field in a database table holding records for numerous customers.

Under a single-tenant infrastructure, separate web servers, application servers, and/or database servers are created for each customer. In other words, each customer will access its dedicated web server(s), will have its transactions processed using its dedicated application server(s), and will have its data stored in its dedicated database server(s) and or catalog(s). In a single-tenant architecture, physical hardware servers may be shared such that multiple installations or instantiations of web, application, and/or database servers may be installed on the same physical server. Each installation may be allocated a certain portion of the physical server resources, such as RAM, storage, and CPU cycles.

In an exemplary implementation, a customer instance is composed of four web server instances, four application server instances, and two database server instances. As previously described each of these server instances may be located on different physical servers and each of these server instances may share resources of the different physical servers with a number of other server instances associated with other customer instances. The web, application, and database servers of the customer instance can be allocated to two different datacenters to facilitate high availability of the applications and data provided by the servers. There may be a primary pair of web servers and application servers in a first datacenter and a backup pair of web servers and application servers in a second datacenter. There may be a primary database server in the first datacenter and a second database server in the second datacenter. The primary database server can replicate data to the secondary database server. The cloud computing infrastructure can be configured to direct traffic to the primary pair of web servers which can be configured to utilize the primary pair of application servers and primary database server respectively. In a failure scenario, the secondary servers may be converted to primary servers.

The application servers can include a platform application, such as one written in Java, for example, that provides generic platform functionality for accessing the database servers, integrating with external applications, and rendering web pages and other content to be transmitted to clients. The generic platform functionality may be configured with metadata stored in the database server. In other words, the operation of the platform on the application server may be customized by certain end-users of the platform without requiring the Java code of the platform application to be changed. The database server instances can be configured with a database configuration and schema to facilitate the operation of the platform. For example, the database server instance can be configured with various tables for storing metadata about applications, tables/fields, menus, forms, business rules, scripts, and custom user interface (UI) elements that are used to customize the appearance and operation of the customer instance. In some implementations, the application servers can include web server functionality and the web servers can be omitted.

In an alternative implementation, a customer instance may include only two application servers and one database server. In a given cloud infrastructure system, different implementations of customer instances may be used for different customer instances at the same time. Other configurations and implementations of customer instances may also be used.

As mentioned, enterprise computing may be implemented in a cloud computing environment. In such a case, for example, analytics, reporting, database management and certain other applications may be standardized for a single customer or organization, while application packages in use and data accessed and changed is different for users due to customization within areas and/or sub-groups. As a result, data is often worked with at different levels (e.g., by users having different roles) within a database hierarchical structure. This makes it challenging to notify provide key changes to data to a role that does not directly interact with that data.

One set of solutions involves users taking operations outside of the data update to find key changes to data. For example, the user updating the data could send an email to other users that would notify them of the change. Alternatively, or in addition thereto, a user desirous of the status of data may search individual records for changes made at other levels. In the example of project management, a project manager might be interested in the overall status of a project while the team members will be interested in managing the tasks assigned to them. If a task associated with a project is canceled by a team member (hence changing the task data), the project manager may not be aware of it by looking at the project data. In this case, either the team member needs to send out an email to the project manager or the project manager has to drill into all the tasks to determine a current status.

Another option is to publish changes to data into a live feed available to other users. By a "live feed," this disclosure means a place (e.g., an address, link or tab) at which to post and share content in an instance as described above. Generally, reference to a feed being a "live feed" means that the notification or message is posted upon submission if it meets the posting criteria or conditions as opposed to some future point in time. However, the invention is not limited to this, and one of the posting criteria may be a time (e.g., a future point in time) at which to post the message. The posted content forms a searchable source of shared information within the organization. Users may post, reply to and/or rate messages and may subscribe to receive an email when new messages are posted/published. Links and images may be attached to messages.

The live feed could be a single live feed associated with the data being updated (that is, associated with the level the data is worked at or posted at the highest level of a hierarchical structure). In this way, all changes could be noticed to all users with access to that feed. However, this could result in a large number of entries, many of which are of no interest to all but a minority of users. Alternatively, this could result in notifications being posted on different live feeds for respective smaller sets of users that would be desirably associated with a larger set of users. Another option is the implementation of defined rules such that the context (for example, the project context) becomes a condition to detect the data change. In that way, the data change could be noticed to a feed associated with the context. Such rule-based notifications would be code-intensive and would require constant updating.

In contrast, the teachings herein make the identification of live feeds for the notification of changes to a table (i.e., to data within a table) based on the data being changed. More specifically, a display form for providing notifications of changes to data provides access to fields on related tables. This may be done, for example, by navigating through a hierarchical table structure presented as a form, list or script. In one example, this may include one or more pull-down menus that include reference fields present in the table and any related fields to the reference field. Reference fields are references to a related table in at least some cases, and a related field is a field within the related table. Selecting the related field brings up the related table's fields and so on through the hierarchy. With the selection of a field of interest, the form can establish a publication instruction for a live field associated with the field of interest. A simple publish instruction on the table notification can be available for some or all of the fields. For example, a task may have a reference field to a project. When the task is canceled, the notification may be published to the project to which the task belongs through the related table (project) and to the task. Multiple feeds associated with some or all of the related fields that the user configures may be notified. Posting to live feeds, including posting criteria, is discussed in additional detail below after a description of the environment in which embodiments of the invention may be incorporated. In this way, changes may be identified to various users of data in a timely fashion while limiting the notifications to only those interested in or having a need to know the information.

FIG. 1 is a block diagram of a distributed (e.g., client-server, networked, or cloud) computing system 100. Use of the phrase "cloud computing system" herein is a proxy for any form of a distributed computing system, and this phrase is used simply for ease of reference. Cloud computing system 100 can have any number of customers, including customer 110. Each customer 110 may have clients, such as clients 112. Each of clients 112 can be in the form of a computing system including multiple computing devices, or in the form of a single computing device, for example, a mobile phone, a tablet computer, a laptop computer, a notebook computer, a desktop computer, and the like. Customer 110 and clients 112 are examples only, and a cloud computing system may have a different number of customers or clients or may have a different configuration of customers or clients. For example, there may be hundreds or thousands of customers and each customer may have any number of clients.

Cloud computing system 100 can include any number of datacenters, including datacenter 120. Each datacenter 120 may have servers, such as servers 122. Each datacenter 120 may represent a facility in a different geographic location where servers are located. Each of servers 122 can be in the form of a computing system including multiple computing devices, or in the form of a single computing device, for example, a desktop computer, a server computer and the like. The datacenter 120 and servers 122 are examples only, and a cloud computing system may have a different number of datacenters and servers or may have a different configuration of datacenters and servers. For example, there may be tens of data centers and each data center may have hundreds or any number of servers.

Clients 112 and servers 122 may be configured to connect to network 130. The clients for a particular customer may connect to network 130 via a common connection point 116 or different connection points, e.g. a wireless connection point 118 and a wired connection point 119. Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of clients 112 and servers 122. Network 130, datacenter 120 and/or blocks not shown may include network hardware such as routers, switches, load balancers and/or other network devices.

Other implementations of the cloud computing system 100 are also possible. For example, devices other than the clients and servers shown may be included in system 100. In an implementation, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as servers 122.

Figure 2:
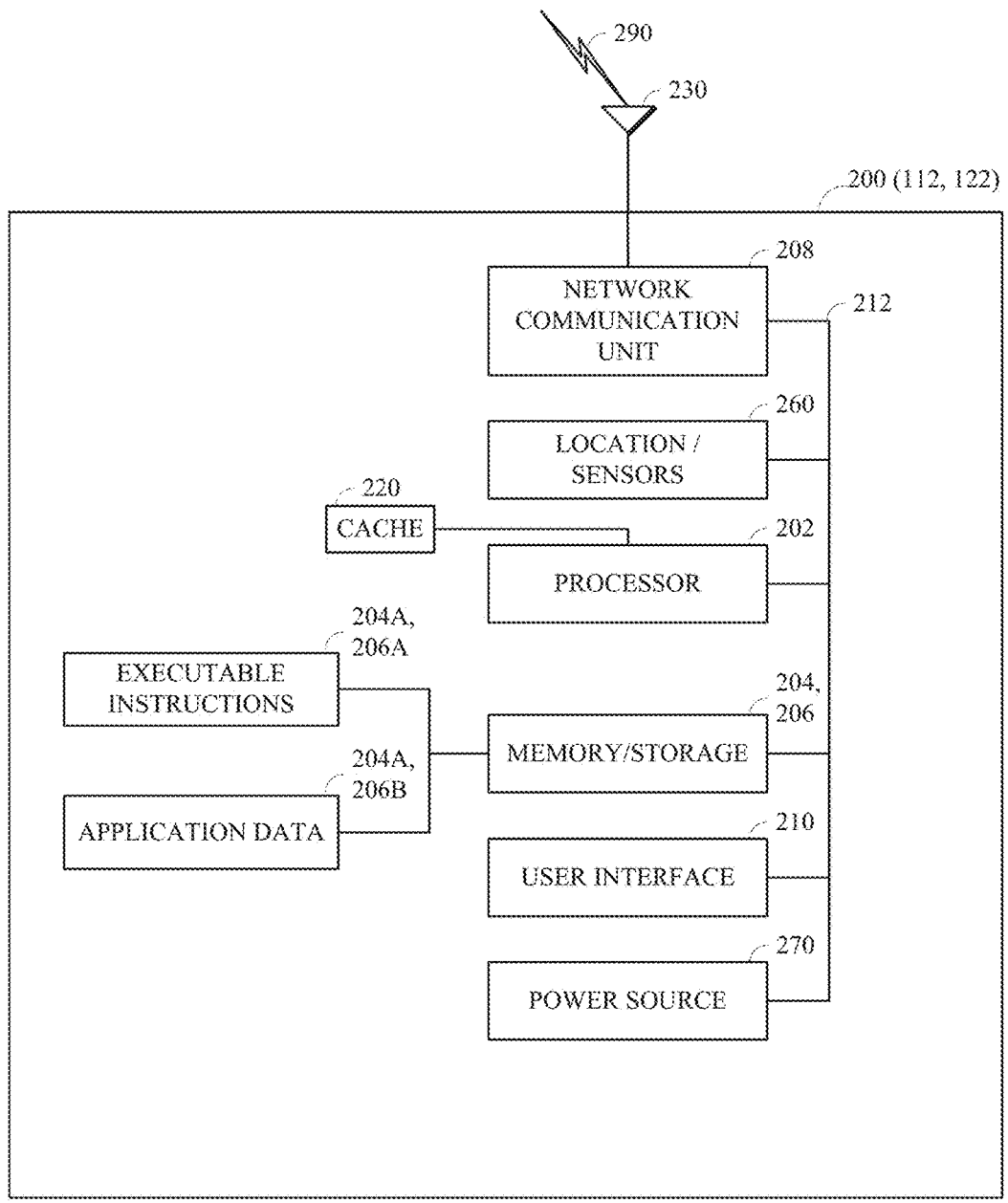
FIG. 2 is a block diagram of an example internal configuration of a computing device, such as a computing device of the computing system as shown in FIG. 1.

FIG. 2 is a block diagram of an example internal configuration of a computing device 200, such as a client 112 or server device 122 of the computing system 100 as shown in FIG. 1, including an infrastructure control server, of a computing system. As previously described, clients 112 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 2. CPU (or processor) 202 can be a central processing unit, such as a microprocessor, and can include single or multiple processors, each having single or multiple processing cores. Alternatively, CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 202 can be distributed across multiple machines that can be coupled directly or across a local area or other network The CPU 202 can be a general purpose processor or a special purpose processor.

Random Access Memory (RAM 204) can be any suitable non-permanent storage device that is used as memory. RAM 204 can include executable instructions and data for immediate access by CPU 202. RAM 204 typically comprises one or more DRAM modules such as DDR SDRAM. Alternatively, RAM 204 can include another type of device, or multiple devices, capable of storing data for processing by CPU 202 now-existing or hereafter developed. CPU 202 can access and manipulate data in RAM 204 via bus 212. The CPU 202 may utilize a cache 220 as a form of localized fast memory for operating on data and instructions.

Storage 206 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 206 can include executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU 202. The executable instructions 206A may be organized into programmable modules or algorithms, functional programs, codes, and code segments designed to perform various functions described herein. The operating system can be, for example, a Microsoft Windows®, Mac OS X®, or Linux®, or operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 includes instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to CPU 202 via bus 212. The network communication unit 208 can utilized any of a variety of standardized network protocols, such as Ethernet, TCP/IP, to name a few of many protocols, to effect communications between devices. The interface 230 can comprise one or more transceiver(s) that utilize the Ethernet, power line communication (PLC), WiFi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. Other output devices that permit a user to program or otherwise use the client or server can be provided in addition to or as an alternative to display 210. When the output device is or includes a display, the display can be implemented in various ways, including by a liquid crystal display (LCD) or a cathode-ray tube (CRT) or light emitting diode (LED) display, such as an OLED display.

Other implementations of the internal configuration or architecture of clients and servers 200 are also possible. For example, servers may omit display 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the device 200 itself or the environment around the device 200, or it may contain a location identification unit 260, such as a GPS or other type of location device. The computing device 200 may also contain a power source 270, such as a battery, so that the unit can operate in a self-contained manner. These may communicate with the CPU/processor 202 via the bus 212.

Figure 3:
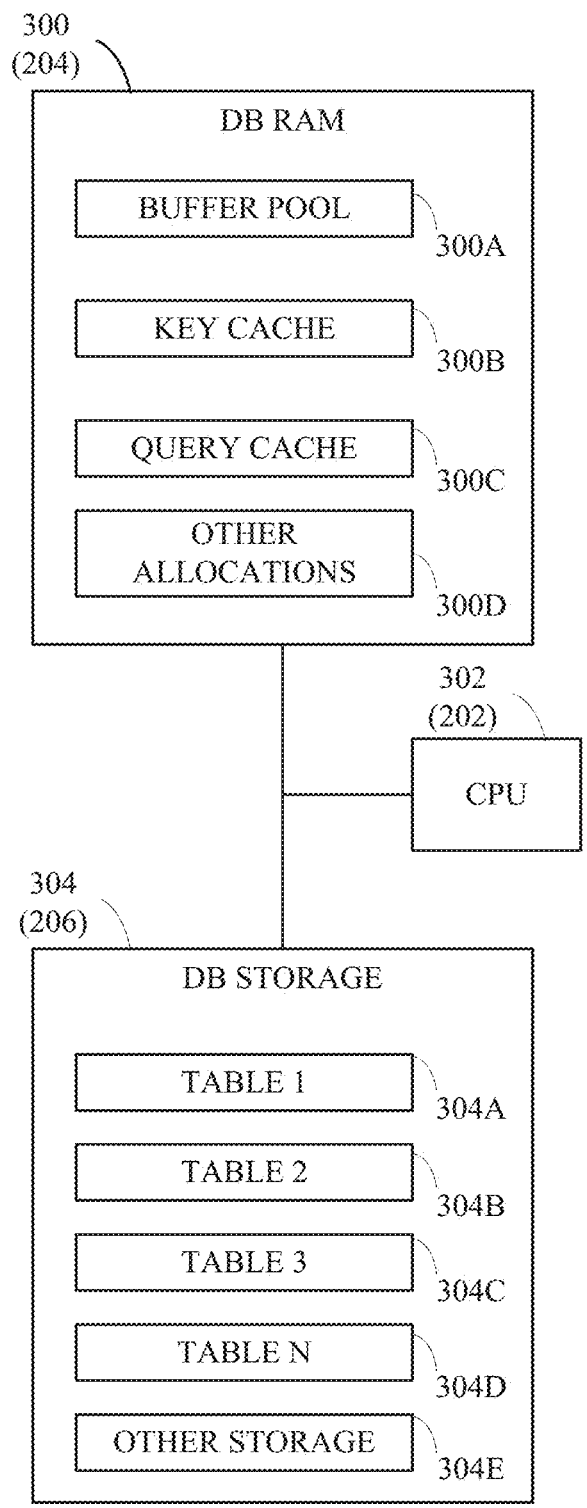
FIG. 3 is a block diagram of memory and storage usage of one example of a database.

FIG. 3 is a block diagram of memory and storage usage of one example of a database. The database may be a database instance DB located on one or more servers in a multi-tenant or single-tenant architecture. The database instance DB can be allocated RAM 300 (204) and storage 304 (206), which can be accessed and processed using CPU 302 (202). RAM 300 can include a buffer pool 300A, key cache 300B, query cache 300C and other memory allocations 300D. Buffer pool 300A can be used to cache table and index database pages from storage 304. Query cache 300B can store some or all previous queries to the database to optimize processing of later similar or same queries. Key cache 300C can be used to store portions of database tables that may be accessed more often than other portions. Each of buffer pool 300A, query cache 300B and key cache 300C may be allocated a certain portion of RAM 300. The size of each allocation may differ, for example, buffer pool 300A may be allocated more RAM than query cache 300B, etc. Other allocations 300D can include other buffers or data structures used in the operation of database instance DB. For example, they may store results of instructions for notifications until they are published. The buffers and data structures used in an implementation of a database instance may vary and may include fewer or additional buffers than described here.

Storage 304 can include storage of table data including Tables 1 to N 304A-304D. The number of tables can vary and can number in the thousands, for example. Storage 304 can also include other storage 304E for storing other data used by the database instance DB, for example configuration data, index data and other information used in the operation of the database instance DB.

Figure 4:
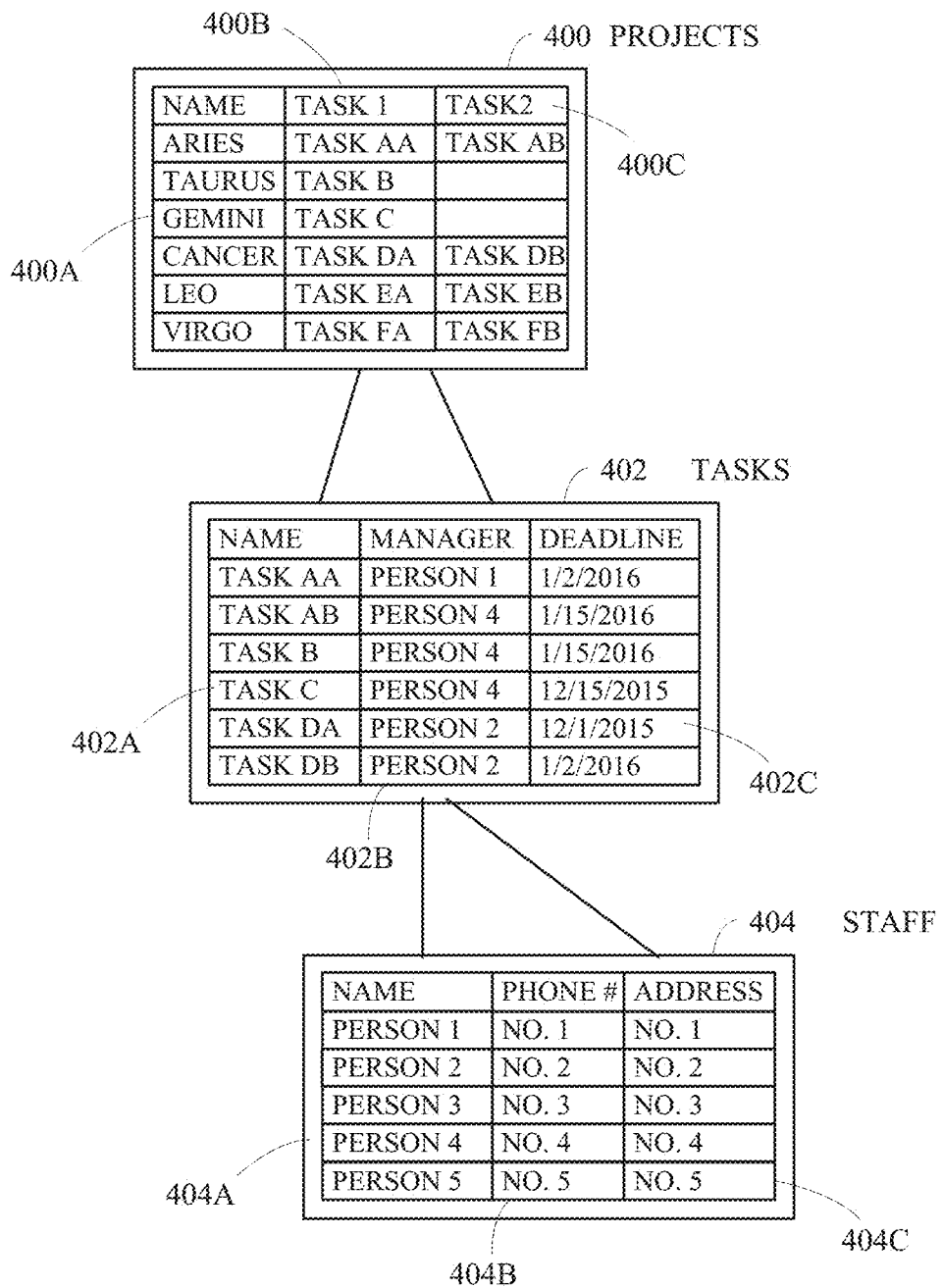
FIG. 4 is a block diagram illustrating a table hierarchy within a database.

FIG. 4 is a schematic of a table hierarchy within a database. The database may be database instance DB of FIG. 3, for example. Although the table hierarchy reflects tables having data associated with project management as an example herein, implementations of the invention may be used with any number of applications whose data is maintained in a hierarchical table structure, such as a relational database. In such a database, data is often located in one and only one table with other tables including references to the data in the single table so that an update in data in one table results in an update to all tables having references to the same data. Each table shows a small fraction of the data therein for discussion purposes only.

A table 400 is named "Projects" and has a list of projects in a first field 400A labeled "Name," a second field 400B labeled Task 1 and a third field 400C labeled Task 2. The entries within each field 400A-400C are referred to herein as reference fields, and each may be a reference to a related reference field within another table. For example, entries within the reference fields of second field 400B and third field 400C refer to tasks within a table 402. Alternatively, only certain of the reference fields may refer to respective reference fields within another table while others are the source table for data. For example, the first field 400A may include data comprising the list of projects—namely, "Aries," "Taurus," "Gemini," "Cancer," "Leo" and "Virgo" such that all other tables having a related reference field for a project could refer to an entry in first field 400A of table 400.

This is illustrated in table 402, which is named "Tasks" and includes a first field 402A, a second field 402B, and a third field 402C. First field 402 is a related field to reference fields 400B and 400C. In one example, data in the form of each new task is added to first field 402A of table 402 with a manager in second field 402B and a deadline in first field 402C. Data for reference fields of second field 402B refer to a table 404 named "Staff". Table 404 includes a first field 404A labeled "Name," a second field 404B labeled "Phone #," and a third field 404C labeled "Address." All tables within the database including reference fields directed to staffing, such as staffing for a task and/or project can obtain data for a staff person from the underlying data within table 404. For example, second field 402B refers to data entries within table 404.

The names of table 400 and the other tables described herein are not generally shown within the respective tables and are omitted here. Labels may or may not be included within the tables and are shown here for convenience.

FIG. 5 is a flow chart of a method for configuring a notification for multiple live feeds 500. According to the method of FIG. 5, notifications may be set up by a user to be generated depending upon the data updated. The operations of FIG. 5 can be performed by CPU 202, 302, for example. Generally, setup involves configuring what notification should be published, which could include the fields whose data needs to be published. This contrasts with runtime generation of the notification described below, which refers to the setup and generation of the notifications using the data.

Figure 7A:
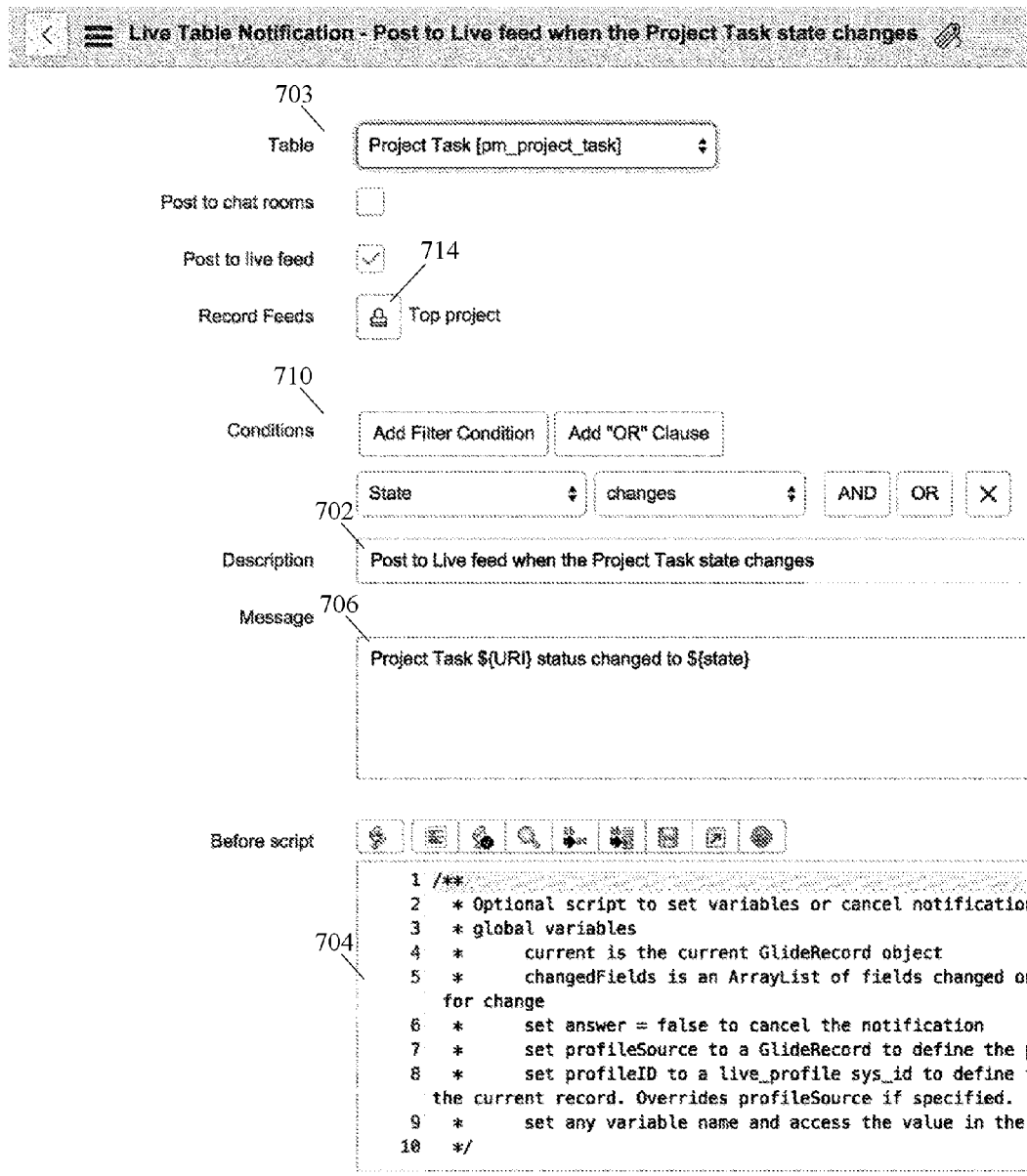
FIGS. 7A & 7B combine to form a screen shot illustrating an input screen used to set up a notification according to FIG. 5.
Figure 7B:
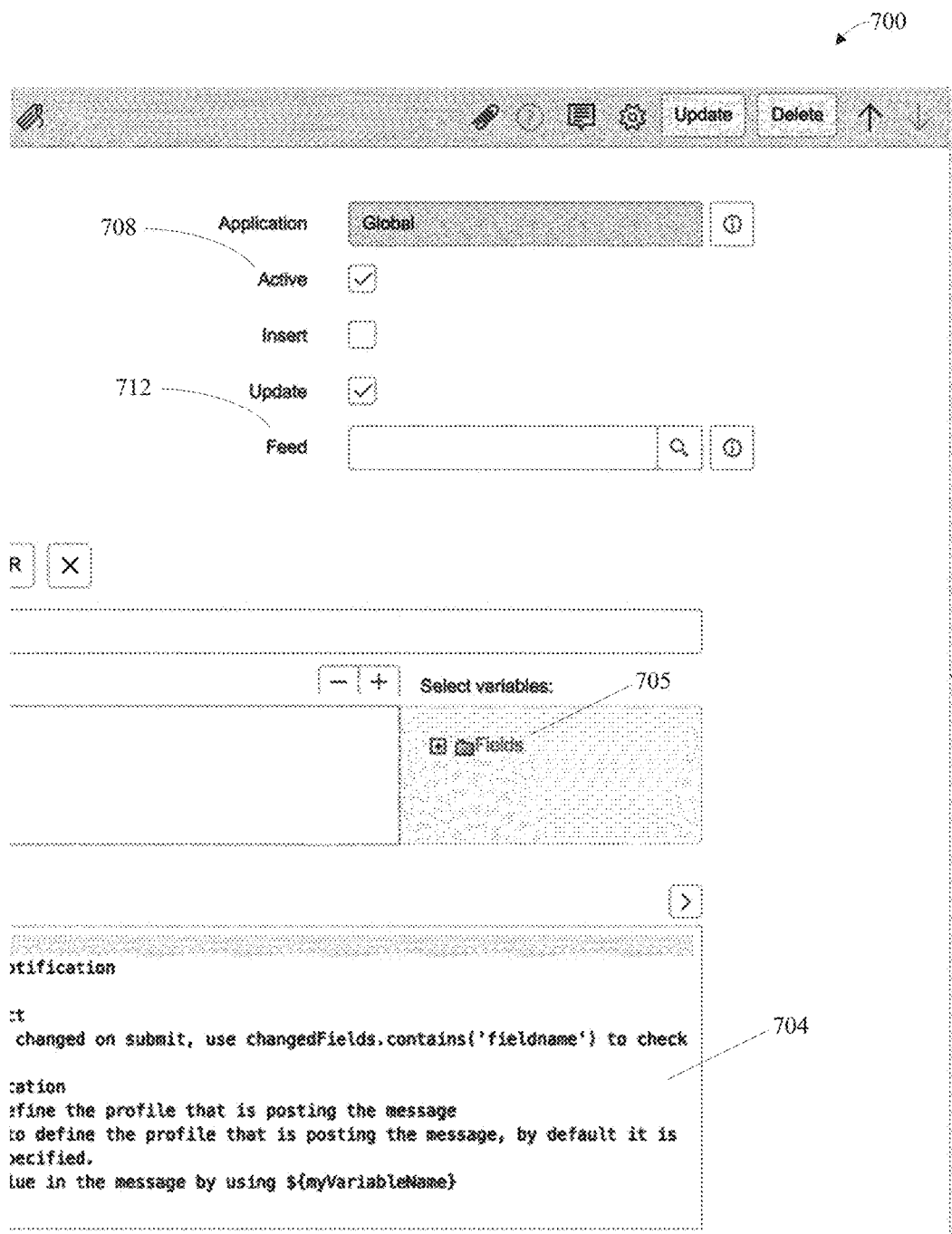

At operation 501, an input screen or user interface is presented to the user, such as a system administrator, so that the user can schedule the notification. The user interface may be presented on display 210, for example. The user interface may include a number of entry fields arranged in any convenient way. One example of an output provided on the display is shown in FIGS. 7A & B, which combine to form a screen shot illustrating an input screen 700 used to set up a notification according to FIG. 5. The entry fields may include, for example, one or more pull-down menus for selecting a table and a reference field within the table using any particular syntax. In one implementation, one pull-down menu could be used that includes a syntax representing the table hierarchy. According to one syntax, each reference field within a table may be represented by "Table.Field". With respect to FIG. 4, for example, the reference field "Projects.Name" reflects a change to an entry in first field 400A. In another example, more than one pull-down menu may be used such that the selection of a table from a first menu populates a second menu with those reference fields available within the table. In one of these ways, or in other ways within the level of skill in the art provided with the teachings herein, a selection from a user of a reference field within a first table, using the Record Feeds UI element 714 (FIG. 7A), is received at operation 502. For example, selections could be made using a navigation technique known as dot-walking, which provides access to fields on related tables from a form, list, or script. If the current table contains a reference to another table, any field on the referenced table can be accessed using dot-walking. Dot-walking references a field by building a chain of field names separated by dots (periods). For instance, incident.assigned_to.company references the company of the user assigned to an incident.

At operation 504, a notification for a change to data within the reference field is configured using the user interface. There may be a number of entry fields to form the notification. A description entry field 702 may be labeled "description," for example, within which the user inserts a description of the notification. For example, FIGS. 7A & B provides an example of a description of "Post to Live feed when the Project Task state changes" 702. The description of the change that is actually posted may be added by the user into another entry field. As shown in FIGS. 7A & B, for example, a code entry field 704 may include code that accesses data within one or more fields of the table to form a portion of the message in the entry field. In the example of FIGS. 7A & B, the message 706 is configured to access the task and the state during runtime as discussed in more detail below. In this way, the description of the change is itself data driven. That is, rather than having a static description broadcast to the live feeds like "Incident state has changed," it is possible to have the description data driven so it is broadcast as "Incident is resolved" or "Incident is closed". Some or all fields of the first table, including those accessible via related tables may be available to construct the description. One or more entry fields may indicate the conditions upon which a notification is made. For example, check boxes 708 could indicate whether a notification is made when new data is inserted or whether existing data is updated or both (e.g., "Insert" or "Update" in FIGS. 7A & B).

A conditions field 710 could also be presented in pull-down menus or other form. In one implementation, three pull-down menus could be arranged as subfields of the conditions field 710 within the user interface such that the first subfield selects a variable associated with the data, the second subfield selects an operator such as "is," "is less than," "is greater than," etc., and the third subfield is a value for the variable. The variables and values are specific to the data within its table. For example, in a table "Incidents," the selection of the variable "state," the operator "is" and the value "closed" would put a condition on the data that the state of the incident within the table is closed in order for a notification to be made. More or fewer entry fields may be available in the user interface. For example, FIGS. 7A & B shows a condition 710 that the record data should meet to trigger the notification as the record is a "state" and the condition is "changes". The notification is configured at operation 504 when the entry fields are completed. Alternatively, or in addition thereto, the notification may be configured with a submit button on the user interface.

Other entry fields are possible. For example, FIGS. 7A & B includes a feed entry field 712 for a feed that is picked at the time of setup instead of being generated based on the data at the time of a change. FIGS. 7A & B also includes a script box 704 for entry of code or a script that provides advanced control beyond that available by the other entry fields in a script execution module. In this example, advanced control may be used to set variables or cancel a notification that would otherwise result from the satisfaction of the conditions established by the pull-down menus.

At operation 506, the selection of a second table is received. The second table is selected based on a reference field related to the reference field received at operation 502. For example, a change to the deadline in table 402 of FIG.

4 could be associated with a task in the first field 402A and then be associated with the higher-level project in table 400. This selection may be received from user input to the same menus previously used by navigating to another table. For example, a change to individual information in table 404 (e.g., a name) could be associated with table 402 when the individual is identified with a task. In this case, the related field is unchanged from the original reference field, but another table with which the field is associated is selected. For example, this could be done in the pull-down menu previously described that includes the database hierarchy in the system syntax.

At operation 508, the notification may be modified for the related field in the second table. This is similar to operation 504 described previously and may include changes to the message or script for advanced control. Alternatively, no changes to the notification configuration are made except to assign it to a related field of the second table.

Although two live feeds are described, the notification may be configured for more than two feeds. Further, conditions for the notification may be modified for each live feed. It is desirable but not necessary for the description and/or message configured with the notification to remain the same. If the notification does not change, the method of FIG. 5 may exclude operation 508 and proceed according to operations 500, 502, 506 and 504. That is, for example, operation 502 can happen multiple times while remaining operations are performed only once.

Once the notification is configured for multiple live feeds, it is ready for publishing upon the instance of a data change. The method of FIG. 5 may be repeated on an as-desired basis. The notifications formed are stored in memory for later access.

FIG. 6 is a flow chart of a method for publishing a notification to multiple live feeds. FIG. 6 demonstrates an example where the notification is the same for each feed, but a different notification may be generated for each live feed depending upon the configuration of the notifications. FIGS. 8A & B combine to form a screen shot 800 illustrating a live feed of a project before a notification is published, and show by example a live feed of project "PRJ0000001" 802. The live feed is shown in front of an input screen for the project.

Figure 8B:
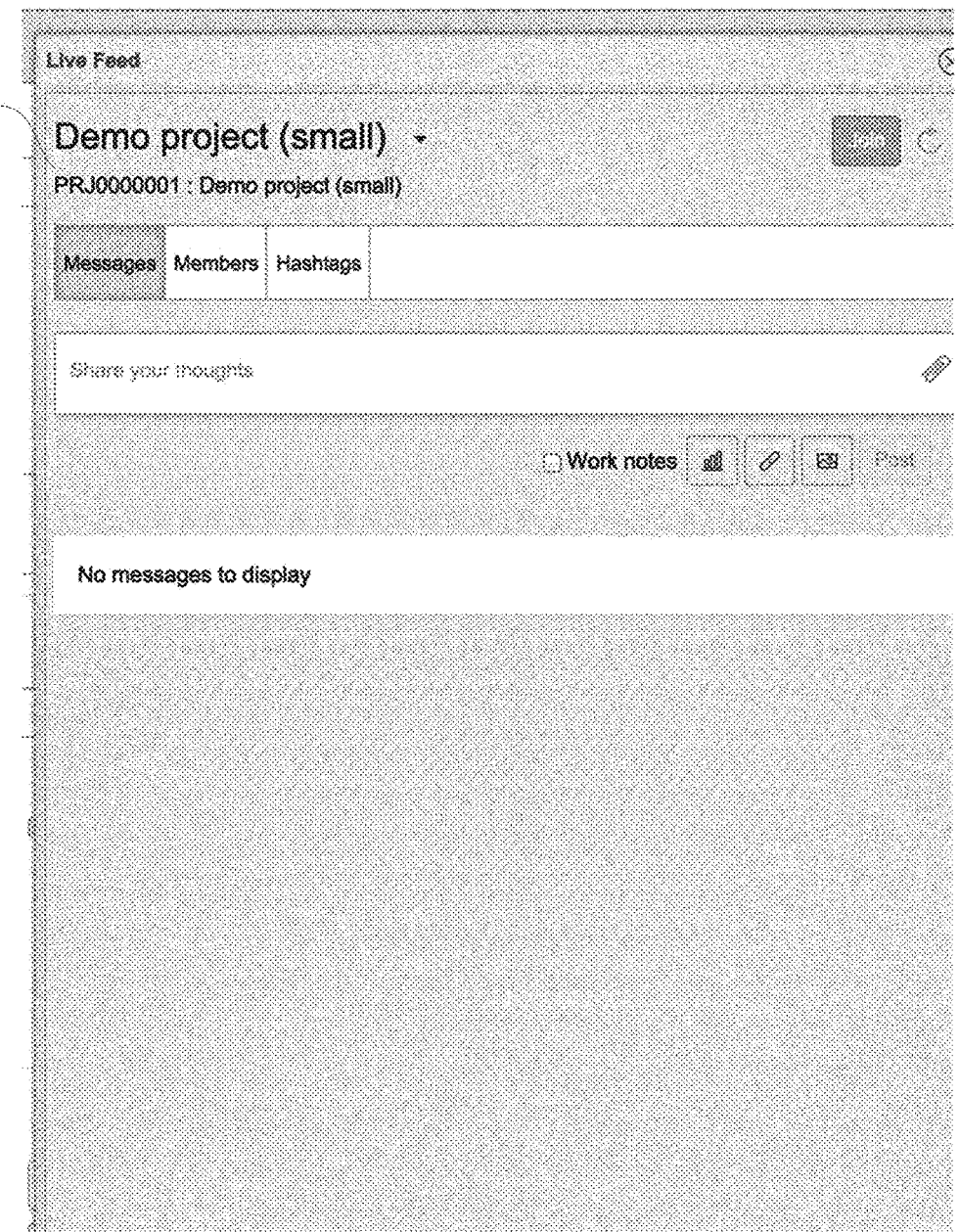
Figure 9B:
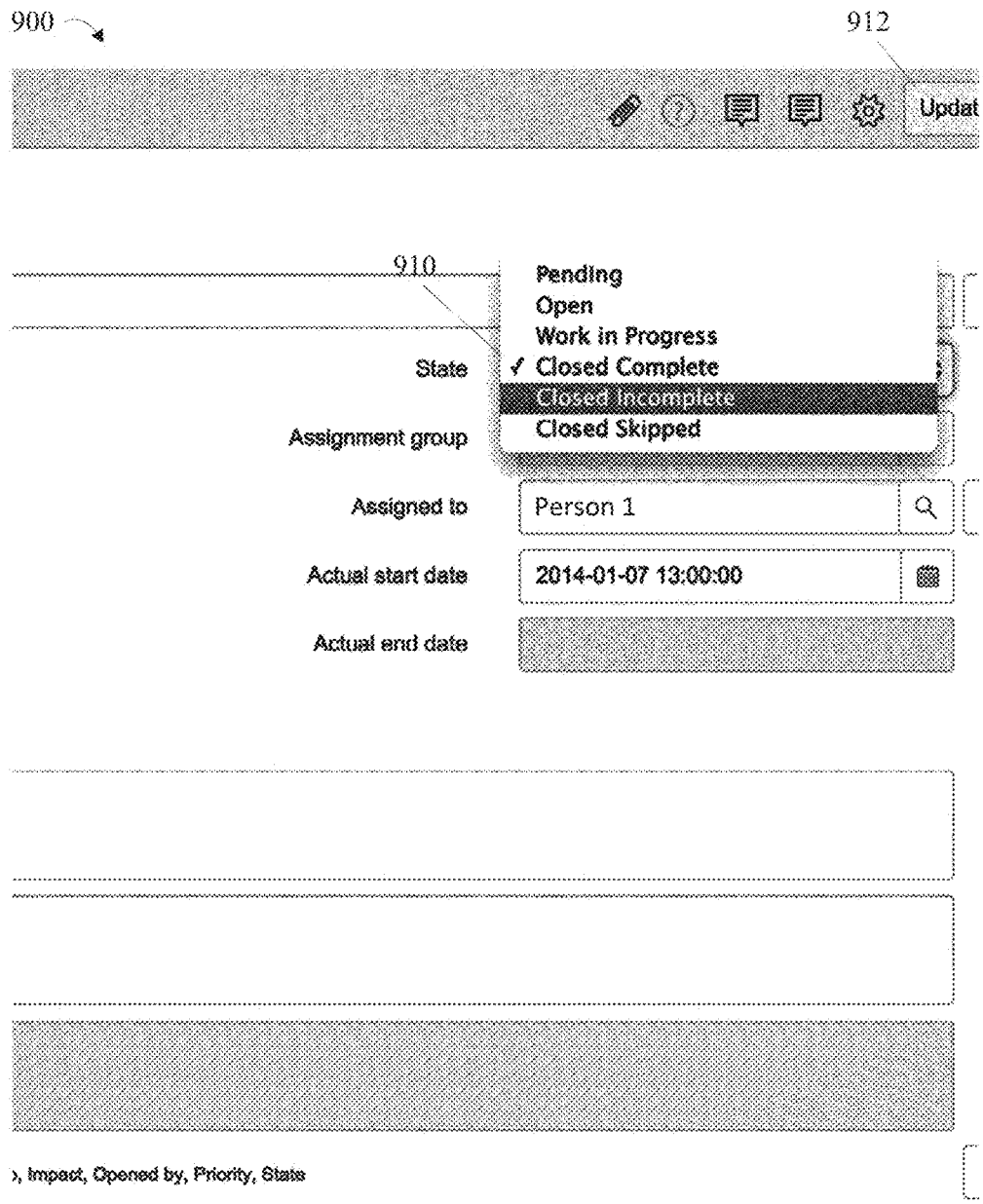

At operation 600, an input screen or user interface is presented to a user by a user interface module and using a user interface connection. In this case, the user may be any person having access to the database or a limited subset of people authorized to change data within the database. The user interface (UI) may be a UI generated specifically for interfacing with the underlying database information for project management and other operational activities. FIGS. 9A & B combine to form a screen shot 900 illustrating an example of an input screen used to make a change in data to a task of the project of FIGS. 8A & B, in this case Subtask 9.2 906 of Task 9 904, which is part of Phase 3 902 of Project "PRJ0000001".

At operation 602, a change is received to data within a first entry field. Based on the change, the notification is generated at operation 604 using a publication module. The notification may be one of the notifications configured by FIG. 5. At operation 606, the notification is published to a first live feed upon a determination that the change meets the conditions, if any, established for publication. In the example of FIGS. 9A & B, Subtask 9.2 906 experiences a state change to "Closed Complete" 910. Upon entry of the change (such as, for example, pressing of the "Update" button 912), the configurations/definitions of the notifications are accessed. In this case, for example, the notification configured as shown in FIGS. 7A & B would look to the project associated with the task and publish to the live feed associated with the project. This is shown by example in FIGS. 10A & B, which combine to form a screen shot 1000 showing the live feed of the project of FIGS. 8A & 8B illustrating published notifications.

More generally, the first live feed may be a live feed associated with the table, such as with a reference field in the table. For example, there may be a respective live feed associated with table 402 named for each of the tasks in first field 402A. The distribution list for the first live feed may be made by the user selecting from a list of staff or may be defined based on the fields in the table, such as a list of staff associated with a task. Another option is to provide a list of available live feeds and allow a user to subscribe to the feed according to any number of known techniques for subscribing to a feed. The assignment may occur upon user activation of a button labeled "assign" on a user interface (not shown), for example.

Similarly, at operation 608, the notification is published to a second live feed upon a determination that the change meets the conditions, if any, established for publication. Publication occurs by posting the notification on the live feeds for display on display 206 for example. The second live feed may be associated with a related field in a second table. The notifications are concurrently published/posted at substantially the same time, that is, substantially simultaneously within the limits of communication paths of the computing device.

Notifications may be sent synchronously or asynchronously. If sent asynchronously, there may be a lag between postings that is based on how loaded the background process is for asynchronous events. Generally, posting is almost instantaneous when there is a light load. However, asynchronous processing provides resiliency when the system is heavily loaded such that there is a lag that is still considered to be at substantially the same time according to the teachings herein.

In this way, changes may be identified to various users of data in a timely fashion while limiting the notifications to only those interested in or having a need to know the information.

Figure 10B:
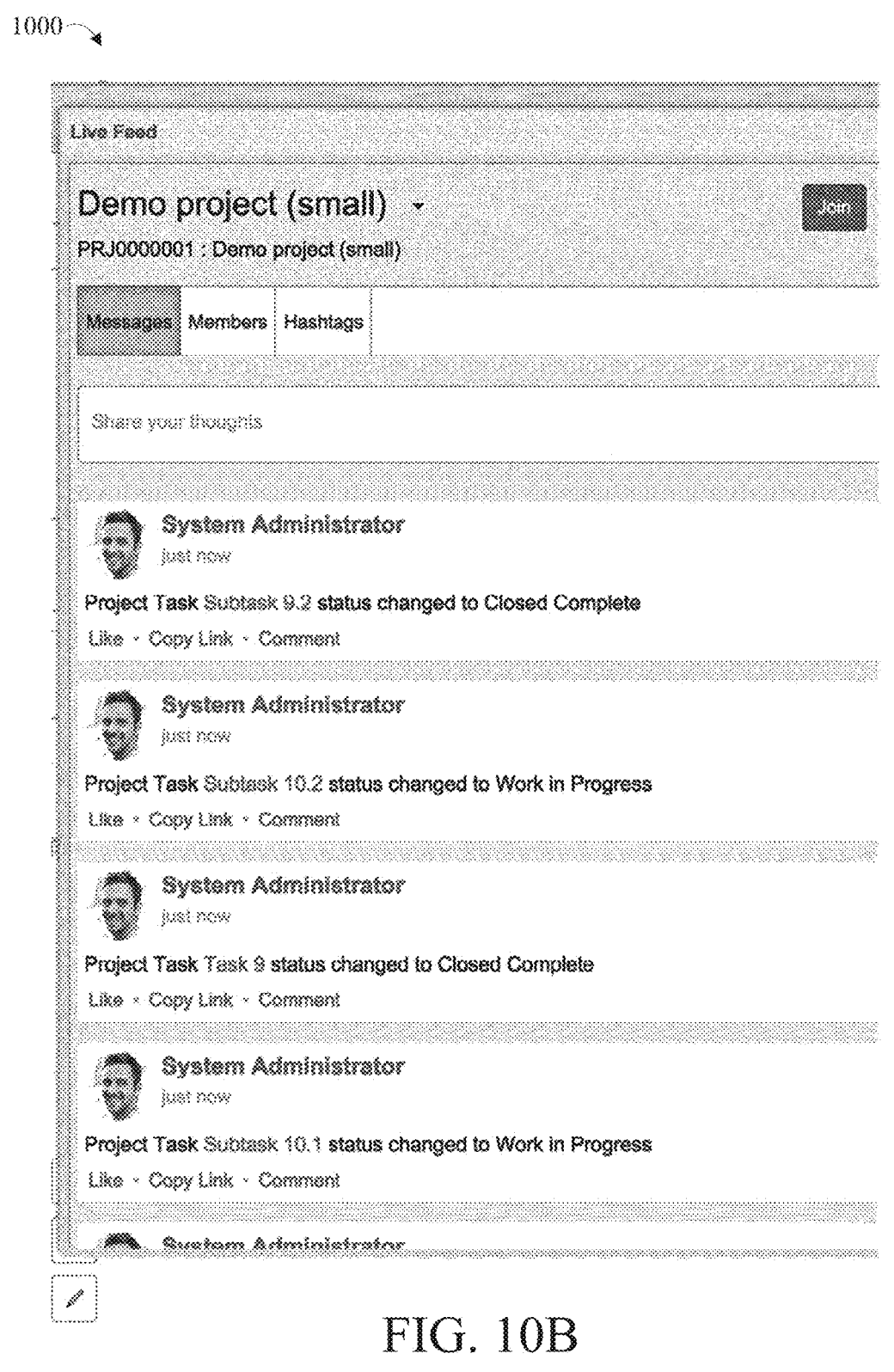

FIGS. 10A & B demonstrate another feature possible according to the teachings herein. In some cases, business rules may be established that change other record data when one record is modified. In these cases, the notifications may be evaluated for those records that are modified via business rules in addition to those directly modified by a user. With respect to the example of FIGS. 10A & B, a business rule establishes that a task is closed when all child tasks are closed. When Subtask 9.2 was closed, Task 9 was closed by this business rule in a task status module. The change to the state/status of Task 9 is also reflected in the live feed of the project.

All or a portion of aspects of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The embodiments herein may be described in terms of functional block components and various processing operations. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described embodiments have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for providing notifications of changes to data through a live feed, comprising:
 a processor configured to execute instructions stored in a memory, the instructions comprising:
   one or more user interface routines that when executed:
    present an input screen via a user interface connection, the input screen comprising a first entry field for a change to data stored within a first reference field of a plurality of reference fields; and
    receive change data over the user interface connection from the first entry field responsive to the change to the data; and
   one or more publication routines that when executed:
    generate a notification based on:
     a message comprising a variable name identifying the first reference field;
     data accessed from the first reference field based on the variable name;
     conditions specified by user-selectable options each defining a pre-defined selection criterion associated with the change to the data; and
     a code or script provided separate from the conditions and that provides additional conditions, wherein the additional conditions specified by the code or script take precedence in modifying the message over the conditions specified by the user-selectable options when in conflict; and
    publish the notification in response to a respective change to the data upon confirming that the change to the data satisfies the conditions and the additional conditions, wherein the notification is published over a communications interface to a first live feed associated with a first table of a plurality of tables, the first table having the first reference field, and to a second live feed associated with a second table of the plurality of tables, the second table having a second reference field related to the first reference field, wherein the notification, when published to the second live feed, differs from the notification published to the first live feed based in part on the message, the conditions, and the additional conditions.

2. The apparatus of claim 1, wherein the one or more publication routines, when executed, asynchronously publish the notification over the communications interface to the second live feed associated with the second table.

3. The apparatus of claim 1, wherein the one or more publication routines, when executed, synchronously publish the notification over the communications interface to the second live feed associated with the second table.

4. The apparatus of claim 1, wherein an identification of the first live feed is based on the changed data.

5. The apparatus of claim 1, wherein the one or more publication routines, when executed, automatically modify data in the second reference field in response to the change data.

6. The apparatus of claim 1, wherein the plurality of tables comprise project management data.

7. The apparatus of claim 1, wherein the first table comprises fields containing project identifiers and related task identifiers.

8. The apparatus of claim 7, wherein the second table comprises fields containing the task identifiers, individual's names, and date data.

9. The apparatus of claim 7, wherein the task identifiers are further broken down into sub-task identifiers.

10. The apparatus of claim 9, wherein the task and sub-task identifiers comprise a state selected from the group consisting of: pending, open, work in process, closed complete, closed incomplete, and closed skipped.

11. The apparatus of claim 10, further comprising one or more task status routines that when executed:
 determine if all sub-tasks making up a task have a status of complete; and
 when all of the sub-tasks making up the task have a status of complete, change the status of the task to complete.

12. The apparatus of claim 1, wherein the code or script provided separate from the conditions provide the additional conditions separate from what can be specified by the user-selectable options used to specify the conditions.

13. The apparatus of claim 1, wherein each pre-defined selection criterion comprises: a table of the plurality of tables, a variable, an operator, or a value.

14. The apparatus of claim 1, wherein the executable code or script is entered via free text entry to the code entry field.

15. The apparatus of claim 1, wherein the plurality of reference fields comprises a first set of reference fields within the first table and a second set of reference fields within the second table, wherein at least one of the second set of reference fields is related to a reference field of the first set of reference fields.

16. An apparatus for assigning notification actions for a live feed related to changes in data in related tables, comprising:
 a processor configured to execute instructions stored in a memory, the instructions comprising:
  one or more user interface routines that when executed:
   present an input screen the input screen comprising:
    one or more fields used to specify conditions for generating a notification in response to a data change within one or more tables, each field populated by a selected, pre-defined option for the respective field; and
    a code entry field provided separate from the conditions populated by an executable code or script that specifies additional conditions, wherein the additional conditions supersede the conditions when a conflict arises between the additional conditions and the conditions;
   receive via interaction with the input screen:
    user selections of entries to the one or more fields specifying the conditions; and
    the executable code or script via text entry to the code entry field;
   produce a configured notification for publication to a first live feed and a second live feed based on a notification message and on the conditions and the additional notification conditions, wherein the additional conditions take precedence in modifying the notification message over the conditions when in conflict, wherein the notification, when published to the second live feed, differs from the notification when published to the first live feed based in part on the notification message, the conditions, and the additional conditions; and
   store the configured notification in the memory.

17. The apparatus of claim 16, wherein the input screen further comprises:
a message field configured to receive and store the notification message used in producing the configured notification.

18. The apparatus of claim 16, wherein the one or more fields comprise a first subfield for entering a variable item, a second subfield for entering an operator, and a third subfield for entering a value of the variable.

19. A method for assigning notification actions for a live feed related to changes in data in related tables, comprising:
presenting an input screen on a display device, the input screen comprising:
one or more fields used to specify conditions for generating a notification in response to a data change within one or more tables, each field populated by a selected, pre-defined option for the respective field; and
a code entry field populated by an executable code or script that specifies additional conditions separate from the conditions, wherein the additional conditions supersede the conditions when a conflict arises between the additional conditions and the conditions;
receiving via interaction with the input screen:
user selections of entries to the one or more fields specifying the conditions; and
the executable code or script via text entry to the code entry field;
producing, using a processor, a configured notification for publication to a first live feed and a second live feed based on a notification message and on the conditions and the additional conditions, wherein the additional conditions take precedence in modifying the notification message over the conditions when in conflict, wherein the notification, when published to the second live feed, differs from the notification when published to the first live feed based in part on the notification message, the conditions, and the additional conditions; and
storing the configured notification in the memory.

20. The method of claim 19 wherein the one or more tables comprise a relational database.

* * * * *